United States Patent
Khandelwal et al.

(10) Patent No.: US 9,822,315 B2
(45) Date of Patent: Nov. 21, 2017

(54) METHODS AND SYSTEMS FOR THE REMOVAL OF HEAVY HYDROCARBONS

(71) Applicant: GTC Technology US, LLC, Houston, TX (US)

(72) Inventors: Rahul Khandelwal, Houston, TX (US); Thu Nguyen, Houston, TX (US); Cole Nelson, Cypress, TX (US); Mircea Cretoiu, Sugar Land, TX (US); Venkata K. Ramanujam, Sugar Land, TX (US); Michael McCaulley, Sugar Land, TX (US); B. Bryant Slimp, Jr., Houston, TX (US)

(73) Assignee: GTC Technology US, LLC, Houston, TX (US)

( * ) Notice: Subject to any disclaimer, the term of this patent is extended or adjusted under 35 U.S.C. 154(b) by 162 days.

(21) Appl. No.: 14/604,713

(22) Filed: Jan. 24, 2015

(65) Prior Publication Data

US 2015/0210934 A1    Jul. 30, 2015

Related U.S. Application Data

(60) Provisional application No. 61/931,450, filed on Jan. 24, 2014.

(51) Int. Cl.
| | | |
|---|---|---|
| *C10G 21/14* | (2006.01) | |
| *C10G 21/28* | (2006.01) | |
| *B01D 11/04* | (2006.01) | |

(52) U.S. Cl.
CPC .......... *C10G 21/14* (2013.01); *B01D 11/0488* (2013.01); *C10G 21/28* (2013.01)

(58) Field of Classification Search
None
See application file for complete search history.

(56) References Cited

U.S. PATENT DOCUMENTS

| | | | |
|---|---|---|---|
| 3,544,453 A | 12/1970 | Thompson | |
| 9,440,947 B2 * | 9/2016 | Lee | ..................... B01D 11/0488 |
| 2009/0200208 A1 | 8/2009 | Farkas | |
| 2011/0306816 A1 | 12/2011 | Cretoiu et al. | |
| 2012/0037542 A1 * | 2/2012 | Wu | ........................... C07C 7/08 |
| | | | 208/313 |

\* cited by examiner

*Primary Examiner* — Tam M Nguyen

(74) *Attorney, Agent, or Firm* — Winstead PC

(57) ABSTRACT

Apparatuses, systems and methods for separating heavy hydrocarbons from a solvent stream are disclosed. The heavy hydrocarbons and solvent can be recovered and processed further.

8 Claims, 3 Drawing Sheets

METHODS AND SYSTEMS FOR THE REMOVAL OF HEAVY HYDROCARBONS

CROSS-REFERENCES TO RELATED APPLICATIONS

This Application claims the benefit under 35 U.S.C. §119(e) of U.S. Provisional Patent Application No. 61/931,450 filed Jan. 24, 2014 which is incorporated herein by reference in its entirety as if fully set forth herein.

BACKGROUND OF THE INVENTION

Aromatics containing streams often contain "heavy hydrocarbons due to green oils from hydro-processing units, carryover from upstream fractionators, various polymers, degradation products, and/or the like." These are currently not easily removed by the processes in the art field.

In view of the foregoing, apparatuses and methods to easily separate heavy hydrocarbons from a solvent processing stream at a refinery would be of considerable benefit. Such apparatuses and methods would allow more efficient operation of refinery process streams and also provide the heavy hydrocarbons in useful form for further processing.

SUMMARY OF THE INVENTION

In various embodiments, apparatuses for removing accumulated heavy hydrocarbons from a solvent stream are disclosed. The apparatuses comprise: a first extractive unit, a second extractive unit, a water input line, a light hydrocarbon (HC) input line and a clean solvent output line.

In various embodiments, apparatuses for removing heavy hydrocarbons from a solvent stream are disclosed. The apparatuses comprise: a first extractive unit, a second extractive unit, a light hydrocarbon input line, a water input line, a heavy hydrocarbon output line and a clean solvent output line. The water input line is supplied by condensed stripping steam from an extractive distillation process.

In other various embodiments, methods for removing heavy hydrocarbons from a solvent stream are disclosed. The methods comprise: providing a first batch of a mixture comprising heavy hydrocarbons and at least one solvent; washing the first batch of the mixture with a raffinate wash; removing the at least one solvent and the raffinate wash from the first batch of the mixture; washing the raffinate from first batch with a water wash in a vertical multi-stage contactor; and isolating an output stream comprising heavy hydrocarbons and a second output of a clean solvent stream.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION OF EXEMPLARY EMBODIMENTS

Figure 1:
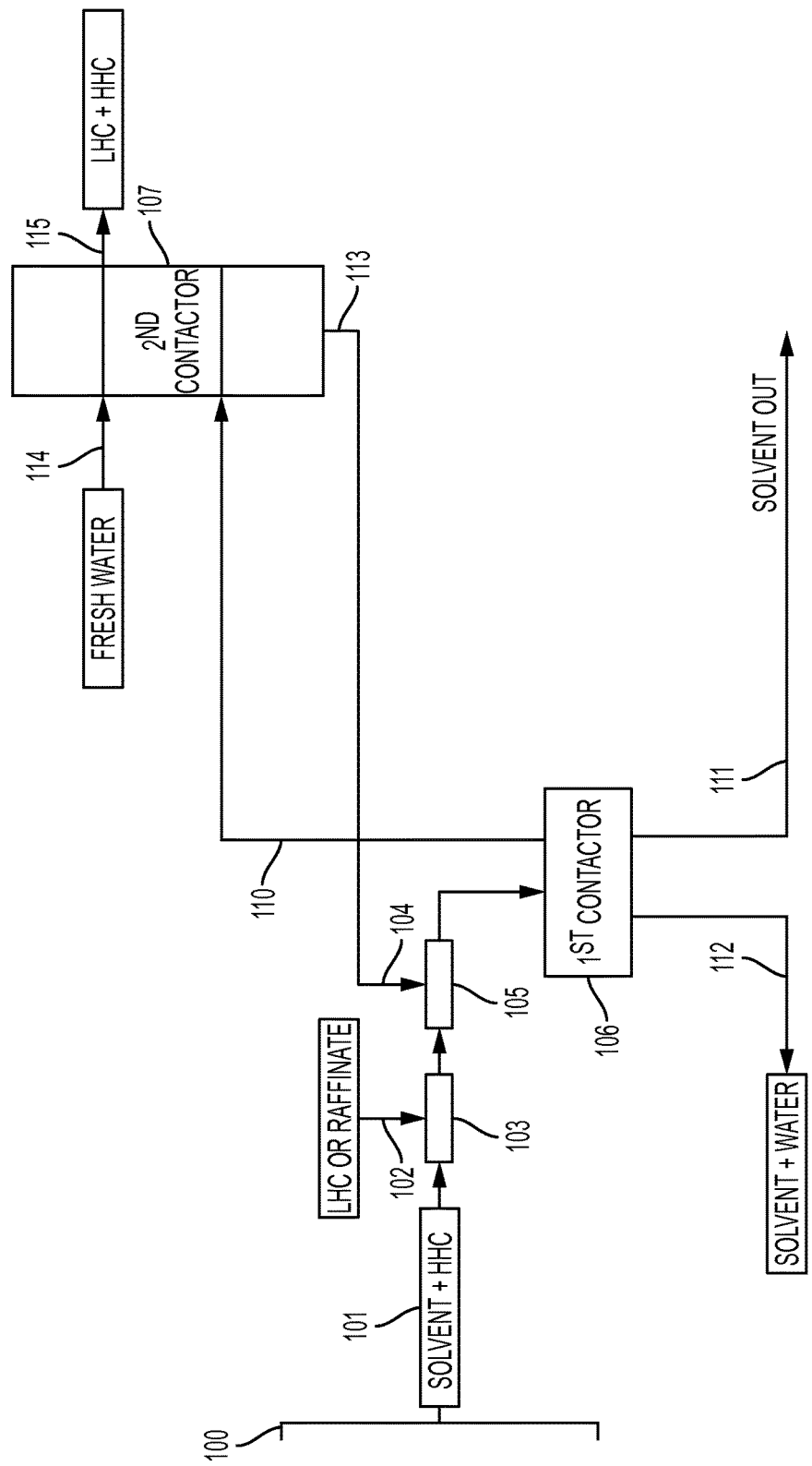
FIG. 1 shows an illustrative heavy hydrocarbon removal system with a water recycle step in accordance with an embodiment of the claimed invention.

In the following description, certain details are set forth such as specific quantities, sizes, etc. so as to provide a thorough understanding of the present embodiments disclosed herein. However, it will be obvious to those skilled in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing a particular embodiment of the disclosure and are not intended to be limiting thereto. Drawings are not necessarily to scale.

While most of the terms used herein will be recognizable to those of skill in the art, it should be understood, however, that when not explicitly defined, terms should be interpreted as adopting a meaning presently accepted by those of skill in the art.

"Raffinate," as used herein, refers to, for example, light, mildly polar hydrocarbons. These are C1-C6 hydrocarbons preferably alkanes and cyclo-alkanes.

Heavy hydrocarbon (HHC), particulary C9+ hydrocarbons such as aromatic and naphtenic hydrocarbons buildup in refinery systems such as, for example, extractive distillation systems can be problematic, particularly when the systems have a closed-loop circulation. Embodiments of the invention are directed to aromatic (C6-C8 aromatics in particular) extraction processes (polar solvent based extractive distillation) in refineries. Heavy hydrocarbon buildup occurs because the heavy hydrocarbons are close or higher boiling than aromatics that are being extracted in the process and have moderate to mild affinity towards the solvent being used for extraction. This results in buildup in the solvent circulation loop which affects aromatics recovery.

Separation of heavy hydrocarbons by simple distillation is difficult or is otherwise energy inefficient. When separation is difficult and, heavy hydrocarbons build up over time, performance of the extractive process can be reduced. In such cases where separation of heavy hydrocarbons is not easily accomplished, alternative separation methods are necessary to maintain production quality and optimal system performance. In the discussion that follows, an illustrative refinery process of extractive distillation is discussed. However, one skilled in the art will recognize that the apparatuses and methods for removing heavy hydrocarbons may be used for any of a number of refinery processes where it is desirable to remove heavy hydrocarbons from a moderately to highly polar solvent. The apparatuses and methods discussed herein below incorporate a light hydrocarbon extraction to remove heavy hydrocarbons from a solvent stream in an extractive distillation process. The apparatuses and methods are advantageous over existing apparatuses and methods in that other than the heavy hydrocarbon removal (HHR) stream, there is a very low quantity of water and organic waste streams that have to be dealt with.

The advantages are: the light hydrocarbon (LHC) stream is slip stream taken from the raffinate overhead in the extractive distillation column and no external feed input is required. The property that raffinate and heavier hydrocarbons to be removed are both non-polar (or mildly polar) in nature is exploited for heavy HC removal. Solvent losses are minimal in the system (<1 ppmw of solvent circulation rate). The property that both water and solvent are polar is nature is exploited to prevent solvent carryover in the raffinate. Further, the water recycle option presented below, reduces the raffinate wash (or LHC) and water wash requirements for the whole system by making the solvent more selective, at the cost of reducing recovery, towards polar compounds, thus reducing affinity towards mildly polar heavy hydrocarbons.

In various embodiments, apparatuses for removing heavy hydrocarbons from a solvent stream are disclosed. The apparatuses comprise: a first extractive unit, a second extractive unit, a light hydrocarbon input line, a water input line, and a heavy hydrocarbon output line and a solvent output line. The apparatuses allow batchwise processing of a solvent stream comprising heavy hydrocarbons. The apparatuses can be operated continuously. Process data can dictate an event suggesting that heavy hydrocarbon removal should be performed. The apparatuses for removing heavy hydrocarbons can also be triggered automatically by detecting, for example, a concentration of heavy hydrocarbons in the solvent stream above a certain allowable level. In some cases the allowable level is 1 wt. % heavy hydrocarbons, in others 5 wt. %, and in others 10 wt. %. Concentration detection of heavy hydrocarbons may be accomplished, for example, by gas chromatography.

An embodiment of the invention, the system consists of a raffinate wash of the solvent slip stream containing heavy HCs. The raffinate wash is the first contractor (single to multi-stage). This is followed by a second contractor which is the water wash contactor (single to multi-stage). The water is recycled back to the raffinate wash unit in certain embodiments. In other embodiments, the water is not recycled. The non-water recycle option, although effective, comes at the expense of increased raffinate wash and water wash flow rate requirement.

In various embodiments of the apparatuses, the solvent stream comprises a slip stream from closed-loop solvent stream. As discussed hereinabove, a closed-loop solvent stream is conducive to buildup of heavy hydrocarbons. In various embodiments, the apparatuses further comprise an output line from the first extractive unit. In various embodiments, the apparatuses further comprise a steam generation (SG) system. For example, solvent can be removed from the output line, regenerated with the steam generation system, and placed back into an extractive distillation system. Such solvent regeneration systems may include, for example, processes and systems to remove water from the solvent before placing it back into the extractive distillation system.

In various embodiments, the apparatuses are coupled to an extractive system. In embodiments where the apparatus are coupled to an extractive system, the extractive system may be used for extraction of aromatic compounds. Aromatic compounds may include benzene, toluene, styrene, and xylenes, for example.

When a threshold concentration of heavy hydrocarbons is detected in the closed-loop extractive distillation system, a controlled portion of the solvent comprising heavy hydrocarbons is automatically transferred and processed by the apparatuses for removing heavy hydrocarbons disclosed herein. FIG. 1 shows an illustrative heavy hydrocarbon removal system 100. A solvent source 101 comprising heavy hydrocarbons is treated with a light hydrocarbon (LHC) feed from input line 102. Mixing is accomplished, for example, in solvent/LHC static mixer 103. Heavy hydrocarbons are extracted with the light hydrocarbons in the first contactor. A water recycle may be optionally supplied from water input line 104. Mixing of the water from water input line 104 with the solvent/LHC mixture of heavy hydrocarbons occurs in water/solvent/LHC static mixer 105. The apparatus comprises a first contractor 106. The first contractor 106 accomplishes removal of the solvent from the bottom of the separator as a separate phase that is free of HHC (heavy hydrocarbons). Removal of the solvent phase occurs through transfer line 112. The solvent, which now depleted of heavy hydrocarbons, can be processed further for placement back into the extractive distillation system. Alternately, the solvent phase can be further processed for solvent recovery, water recirculation, disposal, or a combination thereof. The top phase remaining in first stage separator 106 includes heavy hydrocarbons dissolved in a light hydrocarbon extract.

The top phase in the first stage separator 106 contains a small amount of dissolved or admixed solvent along with the heavy hydrocarbons and light hydrocarbon extract. For preventing solvent losses in the system, it is advantageous to remove the remaining solvent from the heavy hydrocarbons dissolved in the light hydrocarbon extract. Following removal of the majority of the solvent in the solvent phase of first stage contactor 106, the heavy hydrocarbons dissolved in light hydrocarbons are transferred from the first contractor 106 to a second contractor 107. In the second contactor, the LHC+HHC phase (light hydrocarbon and heavy hydrocarbon phase) is washed with fresh water input to extract the solvent carryover in the LHC+HHC phase. In the water recycle option, this water+carryover solvent phase (line 113) is transferred back to the first contactor. From a process point of view, this water makes the polar solvent in the first contactor more selective towards polar compounds but decreases recovery thus reducing its affinity towards heavy hydrocarbons. This reduces the water wash and raffinate wash (LHC) requirements for the whole system. The hydrocarbon phase separated in the $2^{nd}$ contactor consists of the light hydrocarbons and the removed heavy hydrocarbons.

The water wash removed from the bottom of the second contractor 107 contains primarily traces of solvent not separated from the heavy hydrocarbon/LHC mixture in the second stage separator 107. The apparatuses described herein include a transfer line 113, whereby the water wash removed from the second contractor 107 can be utilized as a water wash for the batch of heavy hydrocarbons dissolved in solvent.

Figure 2:
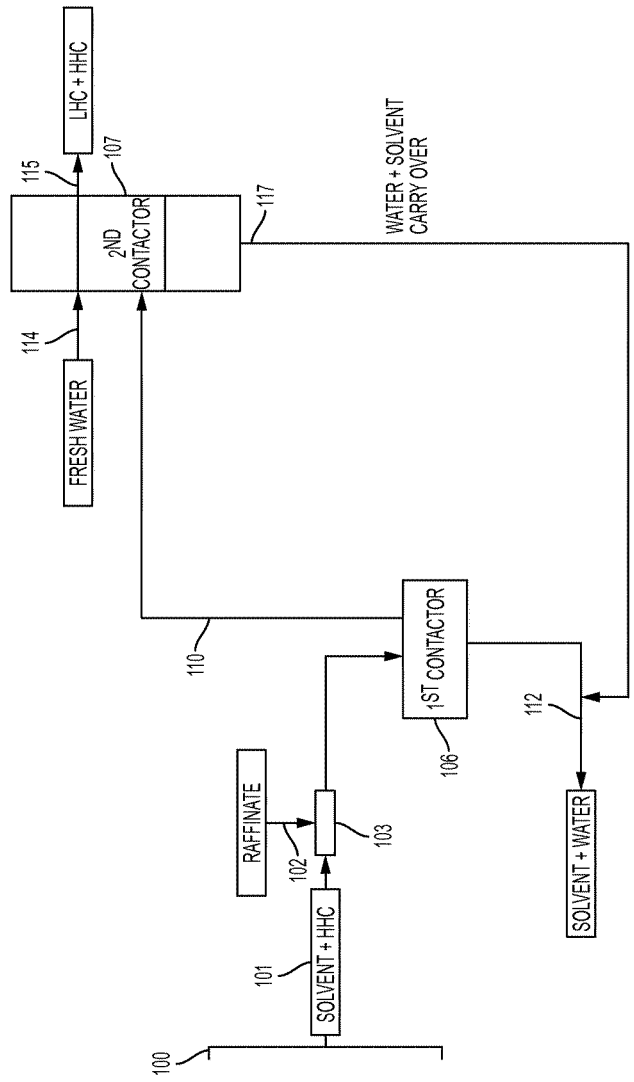
FIG. 2 shows an illustrative heavy hydrocarbon removal system without a water recycle step in accordance with an embodiment of the claimed invention.

The process in FIG. 2 represents an alternate embodiment of the claimed invention, in which the water is not recycled back to the first contactor. A solvent source 101 comprising of heavy hydrocarbons is treated with a light hydrocarbon (LHC) feed from input line 102. Mixing is accomplished, for example, in solvent/LHC static mixer 103. Heavy hydrocarbons are extracted in the light hydrocarbons. The apparatus comprises a first contractor 106. The first contractor 106 accomplishes removal of the solvent from the bottom of the separator as a solvent phase. Removal of the solvent phase occurs through transfer line 112. The solvent is now combined with the water stream from the second contractor 107 and can be fed back into the aromatic extraction process for further processing. The top phase remaining in first stage contactor 106 includes heavy hydrocarbons dissolved in a light hydrocarbon extract plus some additional solvent carryover.

The top phase in the first stage separator 106 contains a small amount of dissolved or admixed solvent along with the heavy hydrocarbons and light hydrocarbon extract. For minimizing solvent losses, it is advantageous to remove the remaining solvent from the heavy hydrocarbons dissolved in the light hydrocarbon extract. Following removal of the majority of the solvent in the solvent phase of first stage separator 106, the heavy hydrocarbons dissolved in light hydrocarbons are transferred from the first contractor 106 to a second contractor 107. The heavy hydrocarbon+light hydrocarbon phase is separated as the top layer in second stage separator 107 and removed as a hydrocarbon stream through hydrocarbon output line 115. The residual solvent in the heavy hydrocarbon/LHC phase is removed as the bottom layer (117) in the second contractor 106.

The heavy hydrocarbon stream removed through heavy hydrocarbon output line 110 from the first contractor 106 is fed to the bottom of the second contactor 107. Fresh water is introduced to the top of the second contactor 107 via water input line 114. Water mixes with the heavy hydrocarbon stream in a countercurrent fashion over multiple stages and selectively extracts residual solvent from the heavy hydrocarbons. This is removed as stream 117 which is combined with stream 112 before being sent back into the aromatic extraction process.

In other various embodiments, apparatuses for removing heavy hydrocarbons from a solvent stream are disclosed. The apparatuses comprise: a first extractive unit, a second extractive unit, a light hydrocarbon input line, a water input line, and a heavy hydrocarbon output line and solvent output line. The water input line is supplied by condensed stripping steam from an extractive distillation process. In various embodiments of the apparatuses, the solvent stream comprises a closed-loop solvent stream. In various embodiments, the apparatuses further comprise an output line from the first extractive unit. In various embodiments, the apparatuses further comprise a steam generation system. In various embodiments, the extractive distillation process comprises an aromatic extractive distillation process. In various embodiments, the stripping steam is produced by the steam generation system.

Figure 3:
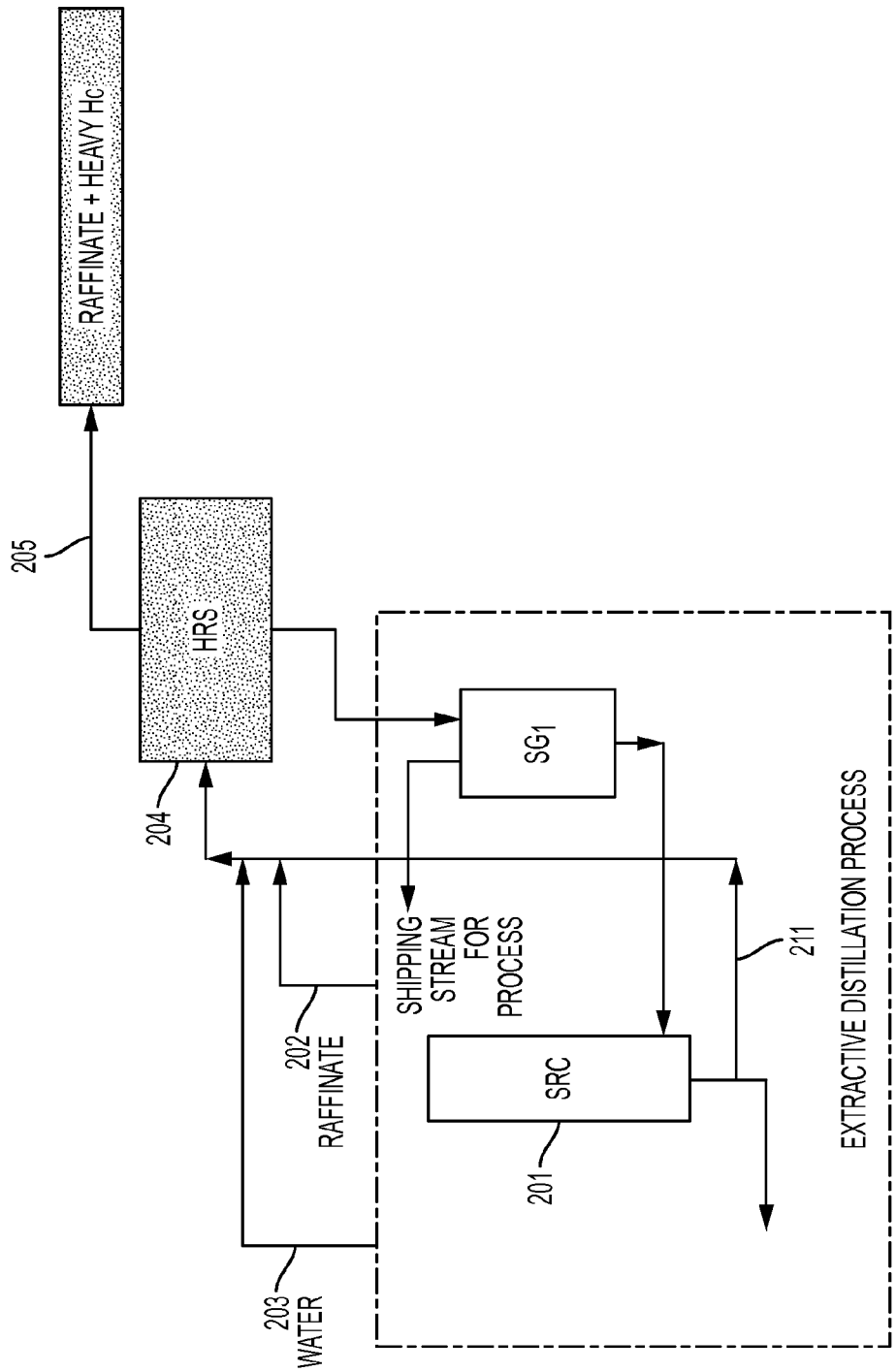
FIG. 3 shows an illustrative coupling of a heavy hydrocarbon removal system to a solvent regeneration system

An illustrative process for which heavy hydrocarbon removal is advantageous is in aromatic extractive distillation. The aromatic extractive distillation process can be coupled to a heavy hydrocarbon removal apparatus (HRS) and a steam generation (SG) system as shown in FIG. 3. Solvent reservoir (SRC) 201 is connected to the aromatic extractive distillation process. As the solvent in solvent reservoir 201 becomes laden with heavy hydrocarbons, a portion of the solvent is released from solvent reservoir 201 into line 211 en route to hydrocarbon removal system 204. The solvent containing heavy hydrocarbons is treated with non-aromatic light hydrocarbons from line 202 and water from line 203. The overhead raffinate from the extractive distillation column in an aromatics extraction process serves the purpose of light hydrocarbon feed required for HHR (heavy hydrocarbon removal) removal system. The fresh water can be withdrawn from the overhead of the Solvent recovery column (in an aromatics extraction process) after condensation. The mixture of heavy hydrocarbons, solvent, non-aromatic light hydrocarbons and water is fed into heavy hydrocarbon removal system 204. For example, as discussed hereinabove, the mixture of heavy hydrocarbons, solvent, non-aromatic light hydrocarbons and water is passed into a first extractive unit and then a second extractive unit to separate water and solvent from heavy hydrocarbons and non-aromatic light hydrocarbons. Heavy hydrocarbons dissolved in non-aromatic light hydrocarbons are removed through output line 205. The water and solvent combined stream (206) can then be fed into the steam generation loop of an aromatic extraction process as shown in the embodiment. It is to be noted that, in the absence of a HHR removal system, water is usually removed from the solvent recovery column overhead and fed into the steam generation section. Hence, water-withdrawal and feeding solvent+water stream when HHR removal system is present, does not deviate from the usual process configuration of an aromatic extraction unit. This is an added advantage of coupling the HHR removal system with an aromatics extraction process.

One skilled in the art will recognize that the heavy hydrocarbon removal system discussed above may be coupled to any of a number of processing conditions where removal of heavy hydrocarbons is advantageous, and the embodiment presented hereinabove coupled to an aromatic extractive distillation process should be considered illustrative. One skilled in the art will further recognize that the processes discussed hereinabove are advantageous in not generating waste solvent or wash water streams. The LHC/heavy hydrocarbon stream can be further processed, for example, for blending into a liquid fuel system or by being transferred to another refinery unit, for example, to crack the heavy hydrocarbons into more useful small organics or co-mingle with the existing process units for this stream.

In various embodiments, methods for removing heavy hydrocarbons from a solvent stream are disclosed. The methods comprise providing a first batch of a mixture comprising heavy hydrocarbons and at least one solvent; extracting the first batch of the mixture with light hydrocarbons; washing the first batch of the mixture with a water wash; washing the first batch of the mixture with a water wash in a vertical multi-stage contactor; removing the water wash; and isolating an output stream comprising heavy hydrocarbons. In various embodiments, the methods further comprise repeating the providing step at least one additional time. Accordingly, methods for removing heavy hydrocarbons as herein disclosed can be conducted continuously.

In various embodiments of the methods, the output comprising heavy hydrocarbons further comprises the light hydrocarbons. In various embodiments of the methods, the solvent stream comprises a closed-loop solvent stream. In various embodiments of the methods, the solvent stream comprises aromatic compounds. In various embodiments of the methods, the extracting step removes heavy aromatic compounds.

In various embodiments of the methods, a concentration of heavy hydrocarbons in the at least one solvent is above a threshold value that triggers operation of the method.

As such, various embodiments of the present invention disclose apparatuses for removing heavy hydrocarbons from a solvent stream, the apparatuses comprising: a first extractive unit; a second extractive unit; a light hydrocarbon input line; a water input line; and a heavy hydrocarbon output line.

In various embodiments, the solvent stream comprises a closed-loop solvent stream. In various embodiments, the apparatuses further comprise an output line from the first extractive unit. In various embodiments, the apparatuses further comprise a solvent regeneration system.

From the foregoing description, one skilled in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is:

1. A method for removing heavy hydrocarbons from a solvent stream, said method comprising:
providing, to a static mixer a first batch of a mixture and a light hydrocarbon, the first batch of a mixture comprising heavy hydrocarbons and at least one solvent;
mixing the first batch of a mixture and the light hydrocarbon in the static mixer to form a mixed product;
feeding the mixed product to a first separator;
extracting, from the first separator, the heavy hydrocarbons and the light hydrocarbons from the mixed product;
removing, from the separator, a solvent fraction from the mixed product;
washing, in a second separator, the heavy hydrocarbons and the light hydrocarbons with a water wash;
removing, from the second separator, said water wash and a carry-over solvent;
isolating an output stream comprising heavy hydrocarbons; and
wherein no water wash is added to the mixed product prior to feeding the mixed product to the first separator.

2. The method of claim 1, wherein said output stream comprising heavy hydrocarbons further comprises said light hydrocarbons.

3. The method of claim 1, wherein said solvent stream comprises a closed-loop solvent stream.

4. The method of claim 1, further comprising:
regenerating the at least one solvent;
wherein the regenerating step comprises use of a solvent regeneration system.

5. The method of claim 4, wherein said water wash comprises condensed stripping steam produced by said solvent regeneration system.

6. The method of claim 1, wherein a concentration of said heavy hydrocarbons in said at least one solvent is above a threshold value that triggers operation of said method.

7. The method of claim 1, wherein said solvent stream comprises aromatic compounds.

8. The method of claim 1, wherein said extracting step removes heavy aromatic compounds.

* * * * *